United States Patent Office 3,784,628
Patented Jan. 8, 1974

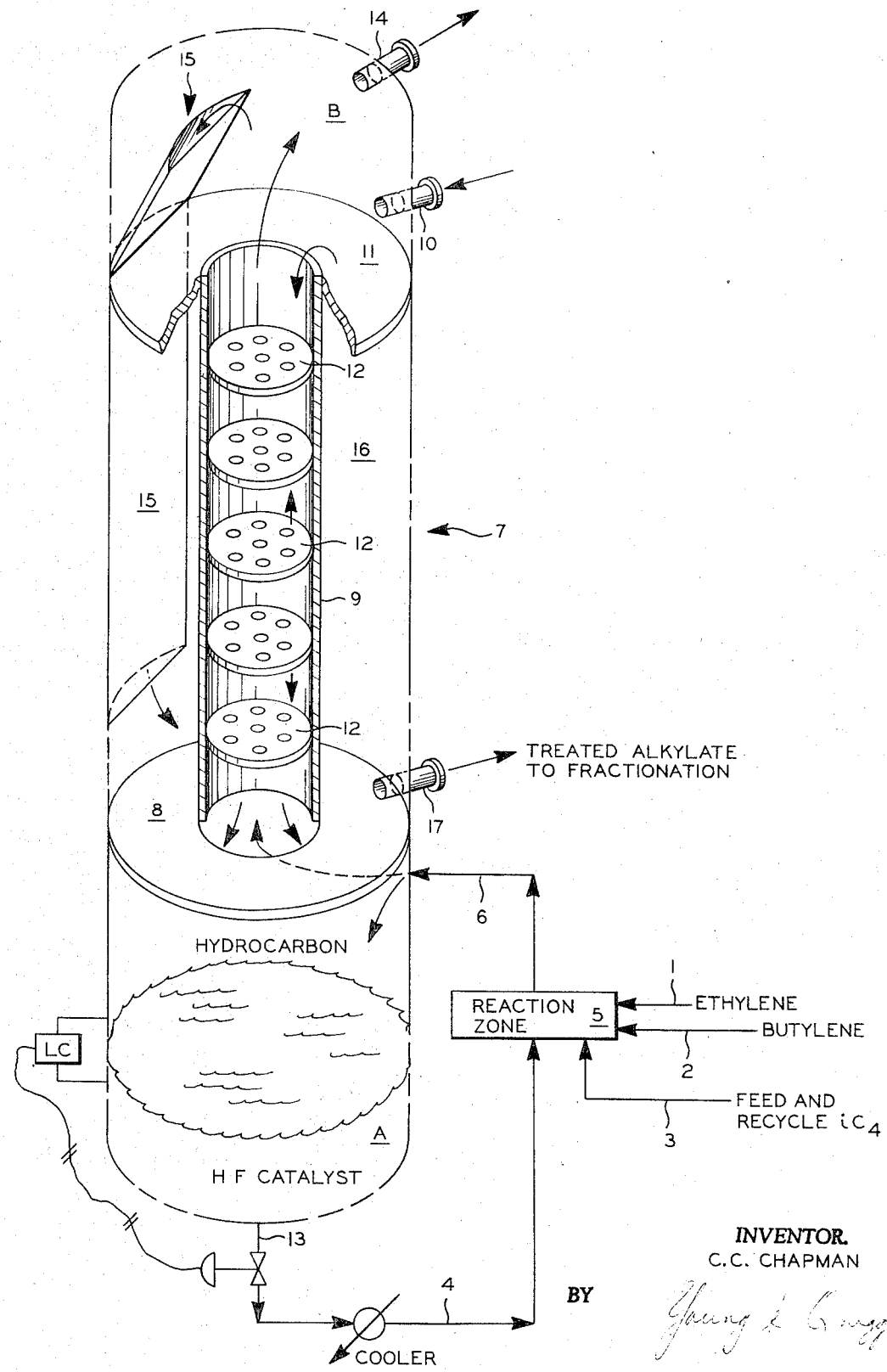

3,784,628
REMOVING ALKYL FLUORIDE WITH HF ACID FROM AN ALKYLATION HYDROCARBON EFFLUENT
Charles C. Chapman, Bartlesville, Okla., assignor to Phillips Petroleum Company
Filed July 6, 1971, Ser. No. 159,884
Int. Cl. C07c 3/50
U.S. Cl. 260—683.42     1 Claim

ABSTRACT OF THE DISCLOSURE

Method and apparatus are described wherein alkylate containing alkyl fluoride is passed upwardly through a series of contacting zones or members in contact with downflowing high purity HF acid, acid is settled below the contacting zone and returned to alkylation while hydrocarbon phase formed above the contacting zone is recovered substantially free from fluoride.

---

This invention relates to alkylation of hydrocarbons. In one of its aspects it relates to the alkylation of an isoparaffin with an olefin under conditions forming alkyl fluoride. In another of its aspects the invention relates to a method for removing alkyl fluoride from an alkylate. Still further it relates to an apparatus for removing alkyl fluoride from an alkylate.

In one of its concepts the invention provides a method for contacting or recontacting hydrocarbon alkylate effluent with high strength acid in a unitary operation comprising a lower settling zone, an intermediate contacting zone, and an upper settling zone, the alkylation on effluent containing alkyl fluoride being passed to said lower settling zone and allowed to settle acid therefrom therein, the hydrocarbon being passed upwardly through said contacting zone in countercurrent flow to high strength or purity HF acid flowing down through said contacting zone, the alkylate effluent having been thus contacted being collected in an upper settling zone and removed therefrom. In one of its concepts the alkylate from the upper settling zone is passed as a separate stream to an intermediate zone surrounding said contacting zone and thence to fractionation. In a further concept the invention provides an apparatus comprising a substantially upright vessel having the following sections: a lower acid from hydrocarbon akylate effluent settling section, an intermediate section containing a riser conduit equipped with contacting elements, perforate disks which may be spaced apart or other means, and an upper settling section having means for introducing high purity HF therein for downflow through said riser countercurrently to the upflowing alkylate, means for removing settled alkylate from said upper settling section, and means for removing acid containing alkyl fluorides from said lower settling section.

In a combination operation employing the method and apparatus of the invention the acid now containing alkyl fluoride is returned to the alkylation operation and/or for rerun or other treatment which can include addition thereto of additional isoparaffin and olefin, including a higher olefin, for production of additional alkylate.

In Ser. No. 138,991, filed Apr. 30, 1971, which is a continuation-in-part of Ser. No. 79,405, filed Oct. 12, 1970, there is described and claimed a process for the alkylation of an isoparaffin with ethylene in the presence of a higher olefin using hydrofluoric acid as a catalyst. Depending upon the conditions employed in that operation there will be varying amounts or no alkyl fluoride in the alkylate obtained.

It is desirable to recover the alkyl fluoride and to beneficiate the same by converting it to additional alkylate.

Various apparatus and method steps have been proposed.

In my copending application Ser. No. 139,017, filed Apr. 30, 1971, I have described a method for converting alkyl fluoride in an alkylate to additional alkylate by contacting the same with an isoparaffin using additional HF acid which comprises the steps of introducing the alkyl fluoride containing alkylate into a lower section of an alkylate treating zone, in said zone passing alkylate upwardly into a midsection of said zone through a zone for subdividing said alkylate (which has isoparaffin such as isobutane therein) and then into an upwardly extended riser-reaction zone while introducing additional HF acid to the alkylate as it emerges from said alkylate subdividing zone and passes upwardly into said riser-reaction zone.

The method of that application also comprises passing reacted alkylate and acid upwardly to an upper section of said treating zone, permitting acid and hydrocarbons to settle out forming a lower acid phase and an upper hydrocarbon phase, removing the upper hydrogen phase, returning settled acid phase downwardly surrounding said riser-reaction zone to said alkylate subdividing zone for admixture of the acid with the subdivided alkylate as it emerges from said subdividing zone. Still further in that application, the method comprises passing a portion of acid from the upper settling section of said treating zone downwardly to the lower section of said treating zone with a head sufficient so as to permit pumping the raw alkylate into said lower zone and to pass the same forcefully upwardly through said alkylate subdividing zone into contact with acid therein.

The present invention differs from the invention of the said application in that in the present invention there is countercurrent flow of the high purity acid with the hydrocarbons in the alkylate. Thus, the high purity acid is introduced to the top of the riser contacting element. Further, the contacting elements or perforate disks or equivalent of the present invention are disposed throughout a substantial length of the contacting zone or riser element. Other differences and distinctions are evident from a consideration of this disclosure and the drawing.

An object of this invention is to provide a method for the alkylation of hydrocarbons. Another object of the invention is to provide an apparatus for the alkylation of hydrocarbons. A further object of the invention is to provide for the removal of alkyl fluoride formed during the alkylation of hydrocarbons from an alkylate containing the same. A still further object of the invention is to recover and convert alkyl fluoride formed during the alkylation of hydrocarbons employing hydrofluoric acid. A still further object of the invention is to provide the unitary apparatus for recovering alkyl fluoride from alkylation effluent.

Other aspects, concepts and the several advantages of the invention are apparent from a study of this disclosure, the drawing and the appended claims.

According to the present invention there is provided a method which comprises alkylating an isoparaffin, e.g., isobutane and/or isopentane, with, say, ethylene, and a higher olefin, e.g., propylene or a butylene, in the presence of hydrofluoric acid, passing an alkylation effluent thus obtained into an alkyl fluoride recovery operation comprising in a unitary zone a lower settling section, separating a substantial portion of acid from the alkylation effluent in such section, passing alkylate hydrocarbon thus obtained upwardly through an extended contacting section countercurrently to high purity HF acid descending therethrough, and thence to an upper settling section and from said settling section to fractionation. In one embodiment the method passes thus treated hydrocarbon separately downwardly from the last mentioned settling section into an intermediate section surrounding said contacting section and thence to fractionation.

Also according to the invention there is provided an apparatus consisting essentially of a unitary shell divided into three sections, a lower section having an inlet and an outlet and at its top being closed by a plate extending across said shell, said plate having mounted thereon a riser conduit, an opening in said plate permitting communication between the bottom section and said riser conduit containing contacting elements which can be spaced apart and terminating at its upper end below the top of said shell, another plate extending across said shell at the end of said conduit, said conduit being in open communication through a perforation in said plate with the uppermost portion of said shell, means for introducing a fluid into the upper portion of said shell for downflow through said riser conduit, and means for removing fluid from the top of said shell.

Referring now to the drawing, ethylene, butylene and isobutane are fed together with HF through conduits 1, 2, 3 and 4 into reactor 5 under alkylation conditions to produce an alkylation effluent removed at 6.

The conditions of alkylation, the mole ratios, temperature pressure and other reaction conditions such as the presence or absence of boron trifluoride are set forth in said application Ser. No. 138,991, filed Apr. 30, 1971. These conditions do not form a part of the present invention.

The alkylation effluent in 6 enters vessel 7 in its lower section A. In section A, acid settles from the hydrocarbon and hydrocarbon is passed upwardly through the opening in plate 8 into riser conduit 9 wherein it contacts downwardly flowing acid introduced at 10 and passing downwardly through plate 11 into riser conduit 9. Spaced apart perforate disks 12 insure good contacting and recovery of alkyl fluoride in the alkylation effluent hydrocarbon. This fluoride is taken with the downflowing acid into the lower portion of section A and ultimately by 13 back to reactor 5. Thus, the hydrocarbon passes upwardly into section B above plate 11. In section B any acid remaining in the hydrocarbon settles and substantially acid free hydrocarbon, which may contain some acid, is removed from section B by pipe 14. As a feature of the invention, a downcomer pipe 15 takes hydrocarbon effluent from the top of section B downwardly into a midsection of the vessel 16. This hydrocarbon fraction assists in cooling the riser reactor and therefore to dissipate the heat of absorption of the ethyl fluoride in the hydrofluoric acid. Hydrocarbon is removed to fractionation by conventional means through pipe 17.

The following is a specific example of operation according to the present invention. This example is based upon knowledge of the art, and of data generally and engineering calculations.

SPECIFIC EXAMPLE

Reactor (5):
- Temperature, °F. ............................................. 90
- Pressure ............................................................ ($^1$)
- (1) Ethylene, B/D ........................................ 700
- (2) Butylenes, B/D ...................................... 300
- (3) Feed and recycle isobutane, B/D ...... 13,450
- (4) HF catalyst, B/D .................................... 58,000

Hydrocarbon from (A) into (9):
- Flow, B/D ...................................................... 14,140
- Volume percent:
  - Normal butane and lighter .................. 89
  - $C_5$ plus (alkylate) ................................ 11
- Organic fluorides, p.p.m. by wt. ............. 16,000

High Purity HF (10) into (9):
- Flow, B/D ...................................................... 400
- Wt. percent HF ............................................ 98
- Organic fluorides, p.p.m. by wt. ............... 1,000

Temperature in Zone 9, °F. ........................... 90

Hydrocarbon from (14) and/or (17):
- Flow, B/D ...................................................... 13,820
- Volume percent:
  - Normal butane and lighter .................. 88.5
  - $C_5$ plus (alkylate) ................................ 11.5
- Organic fluorides, p.p.m. by wt. ............... 1,600

Zone 7:
- Height, ft. ..................................................... 16
- Diameter, ft. ................................................. 6.5

Contactor 9:
- Height, ft. ..................................................... 16
- Diameter, ft. ................................................. 1
- Plates 12, number .................................... 8
  - Area of orifices, each orifice, sq. in. .... 0.5
  - Number of orifices per plate ................ 360

$^1$ To main liquid phase.

Additional alkylate produced from the organic fluorides recovered amounts to 140 barrels per day, valued at $900.

Reasonable variation and modification are possible within the scope of the foregoing disclosure, drawings and the appended claims to the invention the essence of which is that there have been set forth method and apparatus for recovering from an alkylation hydrocarbon effluent alkyl fluoride by said alkylate effluent containing alkyl fluoride to remove alkyl fluoride therefrom by contacting the same in a unitary vessel comprising three sections, a lower, intermediate and an upper section, effluent being passed from the lower section through a riser conduit in the intermediate section into a top section while high purity acid is passed in the top section for downflow through the riser conduit and ultimately down into the bottom section and from there to alkylation, hydrocarbon thus treated being passed from the top of the vessel to fractionation.

I claim:

1. A method for removing from an alkylation hydrocarbon effluent the alkyl fluoride therein contained which comprises passing said effluent into a lower settling section of a treating vessel, therein settling acid from said effluent, passing effluent upwardly from said lower section through an intermediate contacting riser section of relatively reduced cross sectional area with respect to said settling section, said riser having disposed along its length a plurality of mixing and contacting elements, contacting in said intermediate contacting riser section said effluent with high purity HF acid passing downwardly through said contacting riser section, passing the thus contacted effluent into an upper section of said vessel, settling in said upper section any acid entrained by said effluent, passing into said upper section high purity HF and allowing the same to flow downwardly through said riser section, recovering a first portion of the treated effluent from the top of said upper section and passing a second portion of the treated effluent downwardly through a zone surrounding said contacting riser section to provide a heat exchange between said second portion and said riser section, and recovering said second portion from said zone.

References Cited

UNITED STATES PATENTS

| | | | |
|---|---|---|---|
| 3,213,157 | 10/1965 | Hays et al. | 260—683.48 |
| 3,607,970 | 9/1971 | Borst, Jr. | 260—683.42 |

FOREIGN PATENTS

| | | | |
|---|---|---|---|
| 294,171 | 2/1967 | Australia | 260—683.42 |

DELBERT E. GANTZ, Primary Examiner

G. J. CRASANAKIS, Assistant Examiner

U.S. Cl. X.R.

23—285